United States Patent
Murata

(10) Patent No.: US 10,654,207 B2
(45) Date of Patent: May 19, 2020

(54) INJECTION MOLDING MACHINE AND THE MOLDING METHOD THEREOF

(71) Applicant: NISSEI PLASTIC INDUSTRIAL CO., LTD., Nagano-ken (JP)

(72) Inventor: Hirofumi Murata, Nagano-ken (JP)

(73) Assignee: NISSEI PLASTIC INDUSTRIAL CO., LTD., Hanishina-Gun, Nagano-Ken (JP)

(*) Notice: Subject to any disclaimer, the term of this patent is extended or adjusted under 35 U.S.C. 154(b) by 521 days.

(21) Appl. No.: 15/474,643

(22) Filed: Mar. 30, 2017

(65) Prior Publication Data

US 2017/0282423 A1 Oct. 5, 2017

(30) Foreign Application Priority Data

Mar. 31, 2016 (JP) .................. 2016-072394

(51) Int. Cl.
- *B29C 45/76* (2006.01)
- *B29C 45/80* (2006.01)
- *B29C 45/77* (2006.01)

(52) U.S. Cl.
CPC ........ *B29C 45/7653* (2013.01); *B29C 45/766* (2013.01); *B29C 45/77* (2013.01); *B29C 45/80* (2013.01); *B29C 2945/76096* (2013.01); *B29C 2945/76498* (2013.01); *B29C 2945/76505* (2013.01); *B29C 2945/76732* (2013.01); *B29C 2945/76859* (2013.01); *B29C 2945/76869* (2013.01); *B29C 2945/76913* (2013.01); *B29C 2945/76943* (2013.01)

(58) Field of Classification Search
CPC ... B29C 45/7653; B29C 45/766; B29C 45/77; B29C 45/80; B29C 33/202; B29C 33/308; B29C 2043/3444; B29C 43/361; B29C 44/42; B29C 45/00; B29C 45/0053; B29C 45/0062; B29C 45/03; B29C 45/07; B29C 45/14073; B29C 2045/1632; B29C 45/56; B29C 45/561; B29C 45/565; B29C 2045/5695; B29C 2045/703; B29C 45/706

See application file for complete search history.

(56) References Cited

U.S. PATENT DOCUMENTS

2012/0146260 A1* 6/2012 Murata .................. B29C 45/572
264/328.1

FOREIGN PATENT DOCUMENTS

WO    WO 2011/161899 A1    12/2011

* cited by examiner

*Primary Examiner* — Stella K Yi
(74) *Attorney, Agent, or Firm* — Birch, Stewart, Kolasch & Birch, LLP

(57) ABSTRACT

A specific mold status Ac is caused in advance in which the interval of an inner portion Xi in the parting plane direction of a parting gap C between a fixed mold 2c and a movable mold 2m during the injection filling is larger than the interval of an outer edge portion Xo and the interval of the outer edge portion Xo is equal to or lower than a predetermined size Ls including 0. A molding injection pressure Pi is set as an injection pressure at which a non-defective product can be molded and a molding mold clamping force Pc is set as a mold clamping force by which a non-defective product can be molded. During the production, a mold 2 is clamped by a molding mold clamping force Pc and the clamped mold 2 is filled with the injected resin R by a molding injection pressure Pi. After a predetermined cooling time Tc has passed, a molded piece G is removed.

6 Claims, 10 Drawing Sheets

INJECTION MOLDING MACHINE AND THE MOLDING METHOD THEREOF

TECHNICAL FIELD

This invention relates to an injection molding machine and a molding method using this injection molding machine by which a mold clamped by a predetermined mold clamping force is filled with injected resin by a predetermined injection pressure to perform a molding operation.

BACKGROUND ART

Conventionally, a molding method of an injection molding machine disclosed in Patent Publication 1 suggested by the applicant of this application has been already known as a molding method of an injection molding machine by which molds consisting of a fixed mold and a movable mold clamped by a mold clamping apparatus at a predetermined mold clamping force are filled with injected resin by an injection apparatus at a predetermined injection pressure and an injection molding machine having a specific molding mode different from a general molding mode in particular.

This molding method has an objective of securing, even in the case of low-viscosity resin having a characteristic sensitively influenced by a temperature or a pressure for example, molded pieces having a high quality and homogeneity, achieving simpler molding conditions and easier setting, providing easier quality control, and reducing the molding cycle time, thereby improving the mass production and economy. Specifically, such a mold clamping apparatus is used that is a mold clamping apparatus providing the resin compression (natural compression) at least in accordance with the resin solidification in a mold, i.e., a direct pressure-type mold clamping apparatus to use a driving ram of a mold clamping cylinder to displace a movable mold, or a toggle-type mold clamping apparatus in which a tie bar installed between a fixed platen supporting a fixed platen and a pressure-receiving platen includes a movable platen supporting a movable mold in a slidable manner and a pressure-receiving platen and a movable platen have therebetween a toggle link mechanism and a driving mechanism section is used to drive the toggle link mechanism to clamp the mold in a non-lockup status. An injection pressure (molding injection pressure) and a mold clamping force (molding mold clamping force) that can provide a predetermined gap (mold gap) between a movable mold and a fixed mold during injection filling and a non-defective product are calculated and set in advance. During production, the molding mold clamping force is used to clamp the mold clamping apparatus and the molding injection pressure is set as a limit pressure. The injection apparatus is driven to inject and fill the resin into the mold. Thereafter, the passage of a predetermined cooling time is followed by the removal of a molded piece.

SUMMARY OF INVENTION

Technical Problem

However, in the case of the molding method of the above-described conventional injection molding machine, a disadvantage as described below is left unsolved.

Specifically, according to this molding method, attention is paid on a mold clamping apparatus that can provide the natural compression to the volume reduction due to resin solidification in a mold. As a mold clamping apparatus for realizing this, a direct pressure-type hydraulic mold clamping apparatus providing the resin natural compression or a toggle-type mold clamping apparatus providing the mold clamping in a non-lockup status is used. In order to fill resin, a mold gap (predetermined gap) is once caused in the mold and this mold gap is gradually reduced by the natural compression due to the resin solidification. Thus, in the case of this molding method, an interval of the mold gaps is important. Thus, a desired interval is set in the range from 0.03 to 0.30 [mm]. This can consequently provide a desired natural compression or mold gap when this molding method is carried out.

By the way, according to this molding method, since attention is paid on the interval of the mold gaps, the selection (setting) of the interval can achieve the original objective of providing secure molded pieces having a high quality and homogeneity and providing simpler molding conditions and an easy setting, easy quality control, and a shorter molding cycle time. However, the invention does not refer to the shape of the mold gap. This method uses the structure characteristic of the mold clamping apparatus as a means of obtaining the mold gap. However, the invention does not refer to factors other than this.

As described above, the molding method of the injection molding machine in the above-described conventional case does not consider the shape of the mold gap and does not consider factors other than the structure characteristic of the mold clamping apparatus as a means of obtaining the mold gap. Thus, there has been a need to further improve and optimize the molding method.

It is an objective of this invention to provide an injection molding machine and the molding method thereof by which the disadvantage existing in the above-described prior art is solved.

Solution to Problem

In order to solve the above-described disadvantage, an injection molding machine M according to this invention is configured to include a the mold clamping apparatus Mc to clamp a mold 2 consisting of a fixed mold 2c and a movable mold 2m by a predetermined mold clamping force and an the injection apparatus Mi to inject resin R to the mold-clamped mold 2 by a predetermined injection pressure. The injection molding machine includes the mold clamping apparatus Mc to allow, in accordance with the solidification of resin R in a mold 2, at least the natural compression of the resin R by the elastic recovery of the mold 2. During the injection filling, a specific mold status Ac is caused in which the interval of an inner portion Xi in the parting plane direction of a parting gap C between the fixed mold 2c and the movable mold 2m is larger than the interval of the outer edge portion Xo and the interval of the outer edge portion Xo is equal to or smaller than a predetermined size Ls including 0. The injection molding machine is characterized in including a control means 3 including a setting function Fs for setting a molding injection pressure Pi that is an injection pressure at which a non-defective product can be molded and a molding mold clamping force Pc that is a mold clamping force by which a non-defective product can be molded and a control function Fc for using, during the production, the molding mold clamping force Pc to clamp the mold 2 and for injecting and filling the resin R into the clamped mold 2 by the molding injection pressure Pi and for performing, after the passage of the predetermined cooling time Tc, a control for removing the molded piece G.

On the other hand, according to the molding method of the injection molding machine according to this invention, in order to solve the above-described disadvantage, the mold 2 consisting of the fixed mold 2c and the movable mold 2m clamped by the mold clamping apparatus Mc at the predetermined mold clamping force are filled with the injected resin R by the injection apparatus Mi at the predetermined injection pressure to perform a molding operation. During the molding operation, the mold clamping apparatus Mc is used that allows, in accordance with the solidification of the resin R in the mold 2, at least the natural compression of the resin R due to the elastic recovery of the mold 2. The specific mold status Ac is caused in advance during the injection filling in which the interval of the inner portion Xi in the parting plane direction of the parting gap C between the fixed mold 2c and the movable mold 2m is larger than the interval of the outer edge portion Xo and the interval of the outer edge portion Xo is equal to or smaller than the predetermined size Ls including 0. The injection molding machine is characterized in that the molding injection pressure Pi that is an injection pressure at which a non-defective product can be molded and the molding mold clamping force Pc that is a mold clamping force by which a non-defective product can be molded are set and, during the production, the molding mold clamping force Pc is used to clamp the mold 2 and the resin R is injected and filled into the clamped mold 2 by the molding injection pressure Pi and, after the passage of the predetermined cooling time Tc, the molded piece G is removed.

Advantageous Effects of Invention

The injection molding machine M and the molding method thereof according to this invention provide remarkable effects as described below.

(1) During the injection filling, the specific mold status Ac is caused in which the interval of the inner portion Xi in the parting plane direction of the parting gap C between the fixed mold 2c and the movable mold 2m is larger than the interval of the outer edge portion Xo and the interval of the outer edge portion Xo is equal to or lower than the predetermined size Ls including 0. This consequently allows the outer edge portion Xo side at the parting gap C to be different from the interval (size) at the inner portion Xi side. Specifically, at the inner portion Xi side, the interval of the parting gap C providing the optimal natural compression to the resin R can be set. At the outer edge portion Xo side, from the viewpoint of the degassing or burr prevention for example of a mold cavity, the optimal interval of the parting gap C can be set for example, thereby providing the optimization of the interval and shape of the parting gap C. This can consequently secure the effect of the conventional molding method for setting the interval of the parting gap C only, i.e., molded pieces G having a high quality and homogeneity and also can provide effects including the ones to achieve simpler molding conditions and easier setting, to provide easier quality control, and to reduce the molding cycle time for example.

(2) According to a preferred embodiment, the control means 3 is configured to include, during the injection filling, a gap status detector 11 that detects the fixed mold 2c abutted to the outer edge portion Xo and the relative change angle Qm between the outer faces 2cf and 2mf in the movable mold 2m or a physical amount corresponding to this change angle Qm (the measurement distance Lc). The control means 3 also includes a molding machine controller 12 that performs a control to maintain the specific mold status Ac based on the change angle Qm obtained from the gap status detector 11 or the physical amount corresponding to this change angle Qm (the measurement distance Lc). This configuration can directly detect the shape change of the parting gap C between the fixed mold 2c and the movable mold 2m, i.e., the deflection of the mold 2 due to the elastic deformation in an easy and accurate manner.

(3) According to a preferred embodiment, a gap status detector 11 uses a non-contact-type distance measurement sensor 13 that is provided between the outer face 2cf of the fixed mold 2c and the outer face 2mf of the movable mold 2m and that consists of a projection section 13p provided at one of the fixed mold 2c and the movable mold 2m and a reflecting section 13r provided at the other. This distance measurement sensor 13 is used to detect a measurement distance Lc showing a physical amount corresponding to the change angle Qm. By this configuration, the measurement distance Lc obtained from the distance measurement sensor 13 can be used to easily detect the change angle Qm between the outer faces 2mf and 2cf of the mold 2, thus providing easy maintenance and adjustment (correction) and realizing a relatively-low cost.

(4) According to a preferred embodiment, the projection section 13p and the reflecting section 13r provided in the distance measurement sensor 13 are provided at a position away from the outer faces 2mf and 2cf in the outer direction in the orthogonal direction by a fixed distance Lx or more. This configuration can detect the change angle Qm or the physical amount corresponding to this change angle Qm (the measurement distance Lc) in a mechanically-amplified manner, thus allowing even a minute angle change to be securely and accurately detected.

(5) According to a preferred embodiment, the projection section 13p and the reflecting section 13r are supported by support stays 14p and 14r having a predetermined length protruding from outer faces 2cf and 2mf, respectively. This configuration can more easily realize, by a relatively-simple structure, conditions under which the projection section 13p and the reflecting section 13r are away from the outer faces 2mf and 2cf in the outer direction in the orthogonal direction by a fixed distance Lx or more.

(6) According to a preferred embodiment, the projection section 13p and the reflecting section 13r have support mechanisms 15p and 15r, respectively. The support stays 14p and 14r are used to support the support mechanisms 15p and 15r. The support mechanisms 15p and 15r are used to adjust at least the distance Lx from the outer faces 2cf and 2mf to the projection section 13p and the reflecting section 13r. This configuration can optionally perform the sensitivity adjustment (position adjustment) of the distance measurement sensor 13 and also can easily add another adjustment mechanism such as an angle adjustment mechanism to the projection section 13p and the reflecting section 13r.

(7) According to a preferred embodiment, the projection section 13p and the reflecting section 13r included in the distance measurement sensor 13 are arranged so as to have a predetermined interval Lo during the mold clamping prior to the injection filling so that at least a change distance Ln in the shortening direction can be detected. This configuration can set the detection result of the distance measurement sensor 13 at the predetermined interval Lo to 0 (zero reset position), thereby easily detecting the specific mold status Ac based on the change distance Ln in the shortening direction.

(8) According to a preferred embodiment, the setting function Fc of the control means 3 is allowed to have a function to set the molding injection pressure Pi as a limit pressure Ps during the production. This configuration can always maintain the molding injection pressure Pi without requiring a control to a pressure.

(9) According to a preferred embodiment, the interval of the outer edge portion Xo at the parting gap C is set to 0.3 [mm] or less. This configuration can add the interval-like factor of the parting gap C in the conventional case to the shape of the parting gap C, thus diversifying the parting gap C to thereby increase the setting freedom for optimization.

DESCRIPTION OF EMBODIMENTS

Next, the following section will describe a preferred embodiment of this invention based on the drawings. The attached drawings do not intend to limit this invention but is made to promote the understanding of this invention. Regarding well-known matters, the detailed description thereof will not be provided in order to not to obscure the invention.

Figure 9:
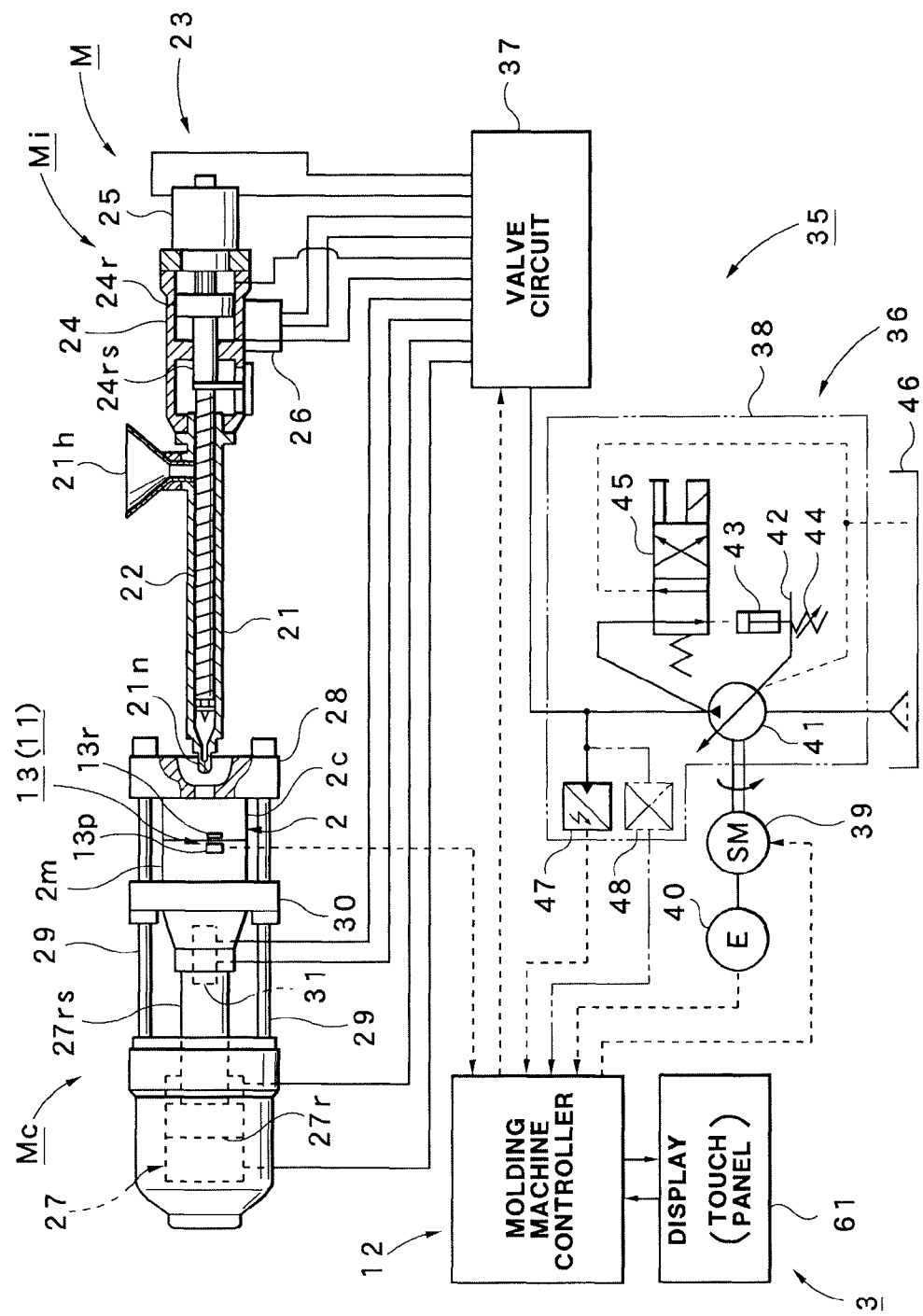
FIG. 9: A illustrates the configuration of the injection molding machine that can carry out the molding method.

First, the following section will describe the entire main configuration of the injection molding machine M according to this embodiment with reference to FIG. 9.

Figure 5:
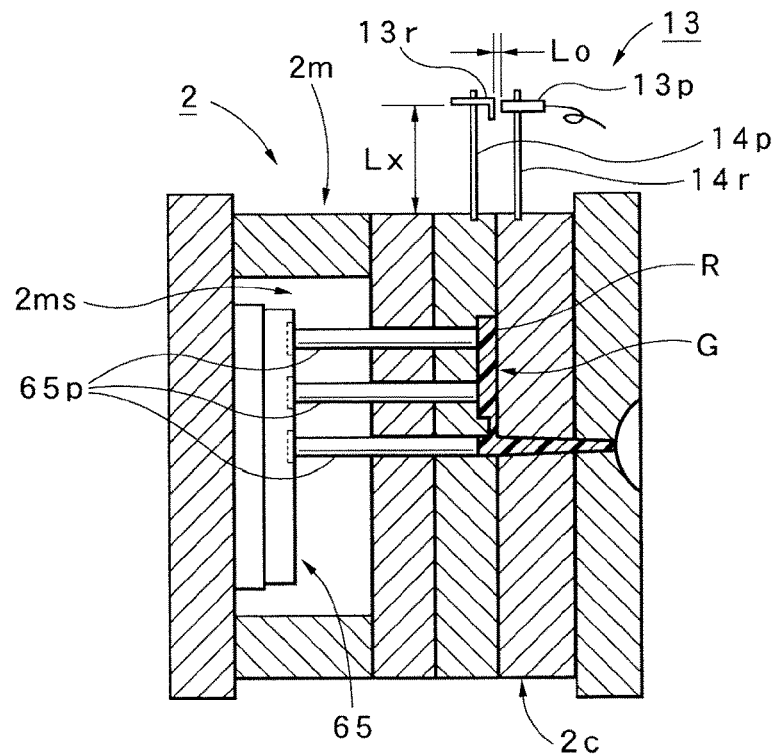
FIG. 5: A bottom cross-sectional view illustrating resin filled in a mold provided in the injection molding machine is fixated due to the natural compression.

In FIG. 9, the reference numeral M denotes an injection molding machine including an injection apparatus Mi and a mold clamping apparatus Mc. The injection apparatus Mi has a heating tube 21 in which the front end has an injection nozzle 21n and the rear part has a hopper 21h, respectively. The heating tube 21 is inserted with a screw 22 and the rear end of the heating tube 21 has a screw driving section 23. The screw driving section 23 has an injection cylinder (hydraulic cylinder) 24 including therein a single rod-type injection ram 24r. A ram rod 24rs protruding to the front side of the injection cylinder 24 is connected to the rear end of the screw 22. The rear end of the injection ram 24r is spline-connected to the shaft of the measurement motor (oil motor) 25 attached to the injection cylinder 24. The reference numeral 26 denotes an injection apparatus moving cylinder to move the injection apparatus Mi in the forward or rearward direction so that the nozzle touches the mold 2 or to cancel the touch. This configuration allows the injection nozzle 21n of the injection apparatus Mi to touch the mold 2, thereby allowing the cavity of the mold 2 to be filled with injected molten (plasticized) resin R (FIG. 5).

On the other hand, the mold clamping apparatus Mc is a direct pressure-type hydraulic mold clamping apparatus to use the driving ram 27r of the mold clamping cylinder (hydraulic cylinder) 27 to displace the movable mold 2m. This mold clamping apparatus Mc has a fixed platen 28 having a fixed position and being provided away therefrom and a movable platen 30 slidably installed to a plurality of tie bars 29 . . . installed among mold clamping cylinders 27. This movable platen 30 is fixed with the tip end of the ram rod 27rs forwardly protruding from the mold clamping cylinder 27. The fixed platen 28 is attached with the fixed mold 2c. The movable platen 30 is attached with the movable mold 2m. The fixed mold 2c and the movable mold 2m constitute the mold 2. This can consequently allow the mold clamping cylinder 27 to open or close and to clamp the mold 2.

On the other hand, the reference numeral 35 denotes a hydraulic circuit that includes a variable delivery hydraulic pump 36 functioning as a hydraulic driving source and a valve circuit 37. The 36 includes a pump section 38 and a servo motor 39 for driving this pump section 38 to rotate. The reference numeral 40 denotes a rotary encoder to detect the rotation number of the servo motor 39. The pump section 38 includes therein a pump body 41 constituted by a tilted plate-type piston pump. Thus, when the pump section 38 includes a tilted plate 42 and the tilted plate 42 has an increased inclination angle (tilted plate angle), the pump body 41 has a pump piston having an increased stroke and the discharge flow rate is increased and the tilted plate angle is reduced, thereby allowing the pump piston to have a reduced stroke and a reduced discharge flow rate. Thus, by setting the tilted plate angle to a predetermined angle, such a fixed discharge flow rate can be set for which a discharge flow rate (maximum capacity) is fixed to a predetermined level. The tilted plate 42 has a control cylinder 43 and a return spring 44. The control cylinder 43 is connected to the discharge opening of the pump section 38 (the pump body 41) via a switching valve (electromagnetic valve) 45. This can consequently control the control cylinder 43 to thereby change the angle of the tilted plate 42 (tilted plate angle).

The pump section 38 has an inlet connected to an oil tank 46. The pump section 38 has a discharge opening connected to the primary side of the valve circuit 37. The secondary side of the valve circuit 37 is connected to the injection cylinder 24, a measurement motor 25, a mold clamping cylinder 27, an ejector cylinder 31 (FIG. 9), and an injection apparatus moving cylinder 26 in the injection molding machine M. Thus, the valve circuit 37 has switching valves (electromagnetic valves) connected to the injection cylinder 24, the measurement motor 25, the mold clamping cylinder 27, the ejector cylinder 31, and the injection apparatus moving cylinder 26, respectively. The respective switching valves are configured by required attached hydraulic components for example such as one or more or two or more valve components and have at least a switching function related to the supply, stoppage, and discharge of hydraulic oil to the injection cylinder 24, the measurement motor 25, the mold clamping cylinder 27, the ejector cylinder 31, and the injection apparatus moving cylinder 26.

As a result, by controlling the rotation number of the servo motor 39 in a variable manner, the discharge flow rate and the discharge pressure of the variable delivery hydraulic pump 36 are allowed to be variable. Based on this, the injection cylinder 24, the measurement motor 25, the mold clamping cylinder 27, the ejector cylinder 31, and the injection apparatus moving cylinder 26 described above can be subjected to a driving control and the respective operation steps can be controlled in the molding cycle. As described above, the use of the variable delivery hydraulic pump 36 for which a change of the tilted plate angle can be used to set a fixed discharge flow rate can set the pump capacity to a predetermined fixed discharge flow rate (maximum capacity) and can provide a variable discharge flow rate and a discharge pressure based on the fixed discharge flow rate. Thus, the control by a control system can be carried out easily and smoothly.

Next, the following section will describe the configuration of the control means 3 in the injection molding machine M according to this embodiment with reference to FIG. 3 to FIG. 10.

The control means 3 performs a processing to realize the molding method of the injection molding machine M according to this embodiment. The basic functions include the one to cause the specific mold status Ac during the injection filling in which the interval of the inner portion Xi in the parting plane direction of the parting gap C between the fixed mold 2c and the movable mold 2m is larger than the interval of the outer edge portion Xo and the interval of the outer edge portion Xo is equal to or smaller than the predetermined size Ls including 0, the setting function Fs for setting the molding injection pressure Pi that is an injection pressure at which a non-defective product can be molded and the molding mold clamping force Pc that is a mold clamping force by which a non-defective product can be molded, and the control function Fc for using, during the production, the molding mold clamping force Pc to clamp the mold 2 and for injecting and filling the resin R into the clamped mold 2 by the molding injection pressure Pi and for removing the molded piece G after the passage of the predetermined cooling time Tc.

Figure 10:
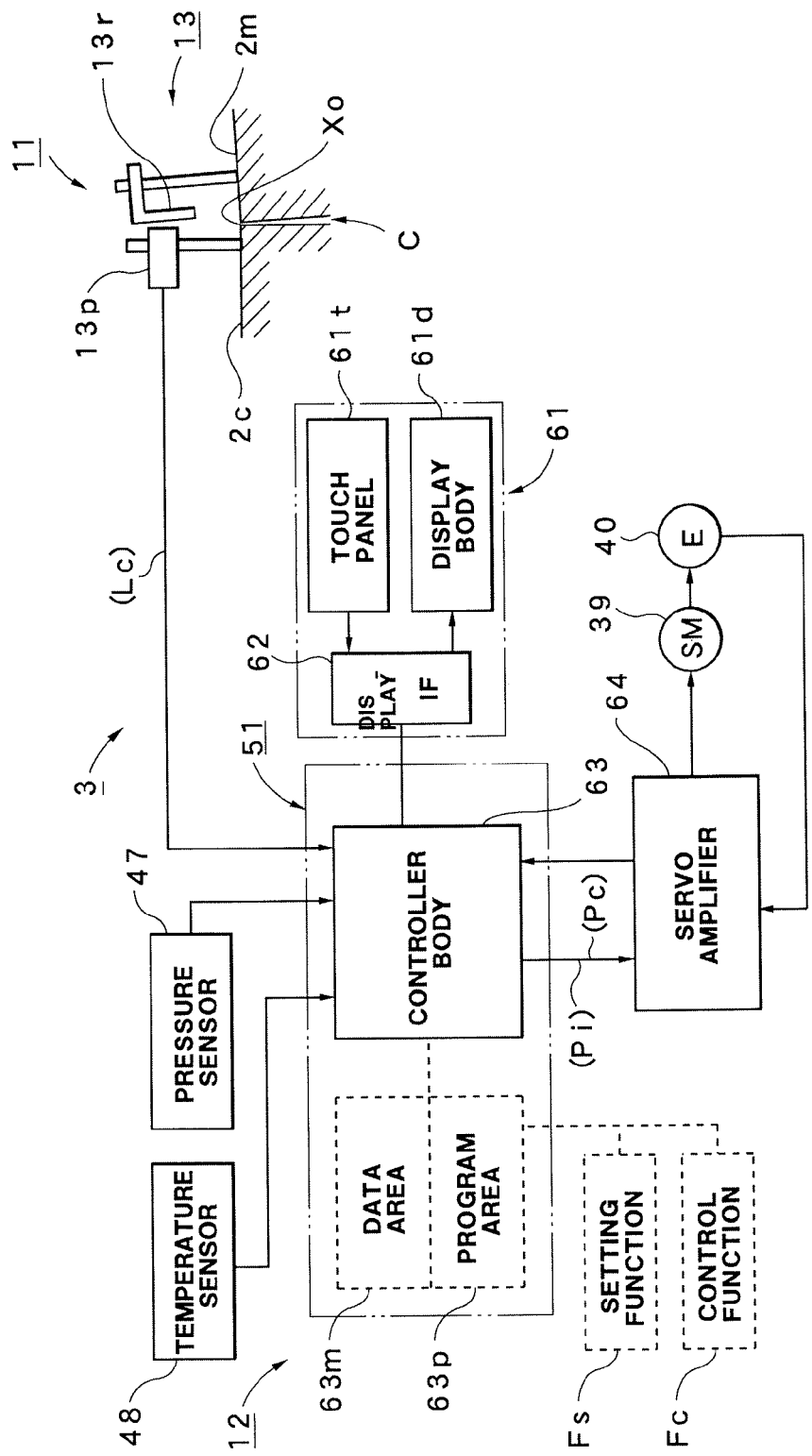
FIG. 10: A block system diagram of a control means that can carry out the molding method.

In order to realize this, the control means 3 has the gap status detector 11 and the molding machine controller 12 shown in FIG. 9 and FIG. 10. The gap status detector 11 uses a distance measurement sensor 13 shown in FIG. 3 and FIG. 4, i.e., the distance measurement sensor 13 provided between the outer face 2cf of the fixed mold 2c abutted to the outer edge portion Xo of the parting gap C and the outer face 2mf of the movable mold 2m. The illustrated distance measurement sensor 13 is a non-contact distance measurement sensor including the projection section 13p provided on the outer face 2cf of the fixed mold 2c and the reflecting section 13r provided on the outer face 2mf of the movable mold 2m. This can allow ultrasonic waves or laser light (hereinafter referred to as measurement light) to be projected from the projection section 13p and measurement light reflected from the reflecting section 13r is received to thereby measure the distance between the projection section 13p and the reflecting section 13r.

As described above, in order to configure the gap status detector 11, the non-contact distance measurement sensor 13 is provided that is provided between the outer face 2cf of the fixed mold 2c and the outer face 2mf of the movable mold 2m and that consists of the projection section 13p provided at one of the fixed mold 2c and the movable mold 2m and the reflecting section 13r provided at the other. This distance measurement sensor 13 is used to detect the change angle Qm, i.e., the change angle Qm between the outer face 2mf of the movable mold 2m and the outer face 2cf of the fixed mold 2c in the mold 2 or the measurement distance Lc showing a physical amount corresponding to this change angle Qm. This can allow the measurement distance Lc obtained from the distance measurement sensor 13 to easily detect the change angle Qm between the outer faces 2mf and 2cf of the mold 2, thus advantageously providing the maintenance and adjustment (correction) in an easy manner and with a relatively-low cost.

In this case, the projection section 13p and the reflecting section 13r are respectively provided at positions away from the outer faces 2mf and 2cf in the outer direction in the orthogonal direction by the fixed distance Lx or more. If conditions using a distance equal or longer than this distance Lx are used, an increase of the distance of the conditions provides advantageous measurement but causes an increased protrusion length, which is a distracting existence. In order to avoid such a distracting existence, the distance can be basically selected to be equal to or longer than 10 [mm] and desirably can be selected in a range from 10 to 100 [mm] and optimally can be selected in a range from 20 to 50 [mm].

Figure 3:
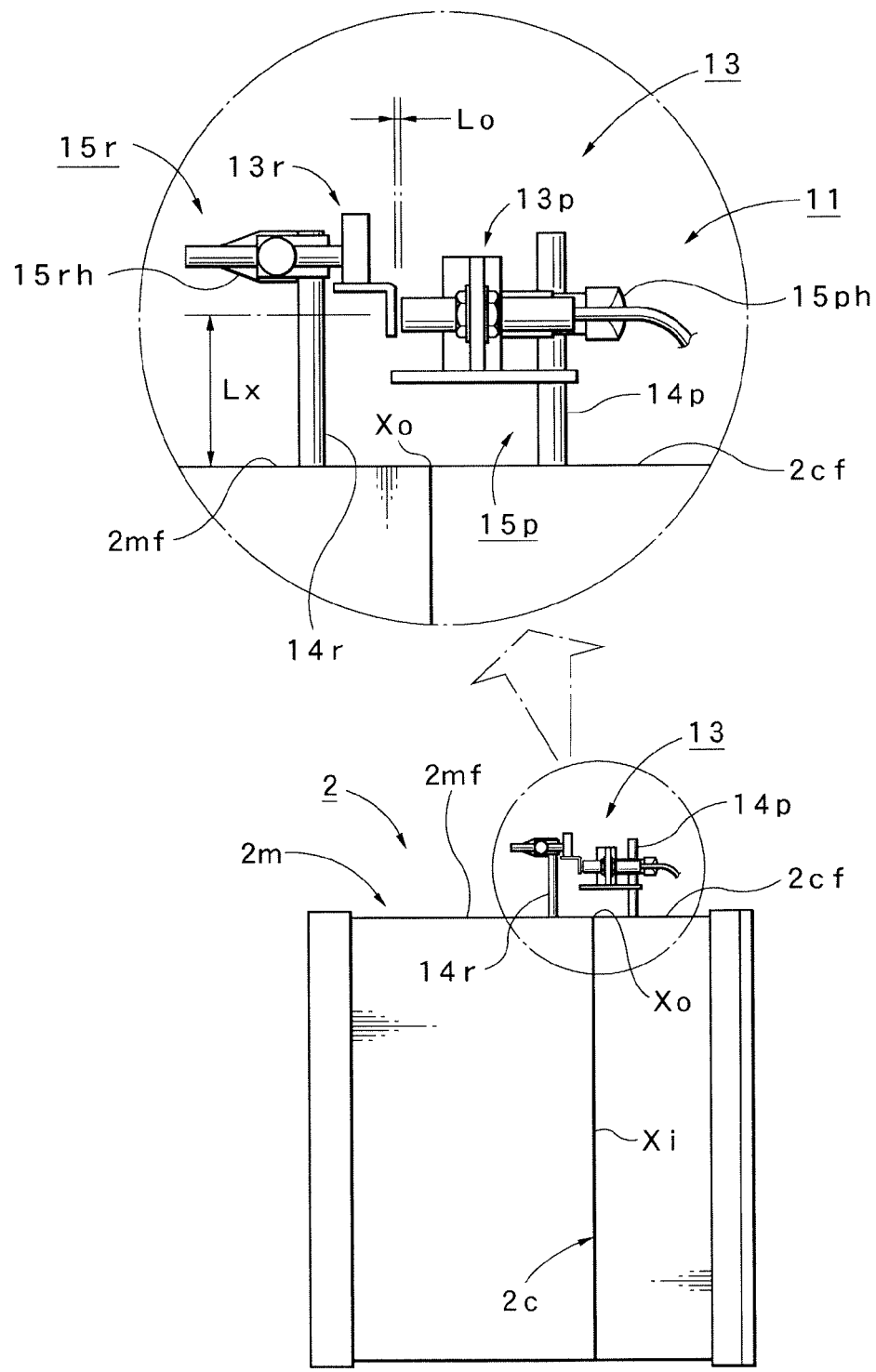
FIG. 3: A illustrates the configuration of a bottom face of a distance measurement sensor provided in the injection molding machine.
Figure 4:
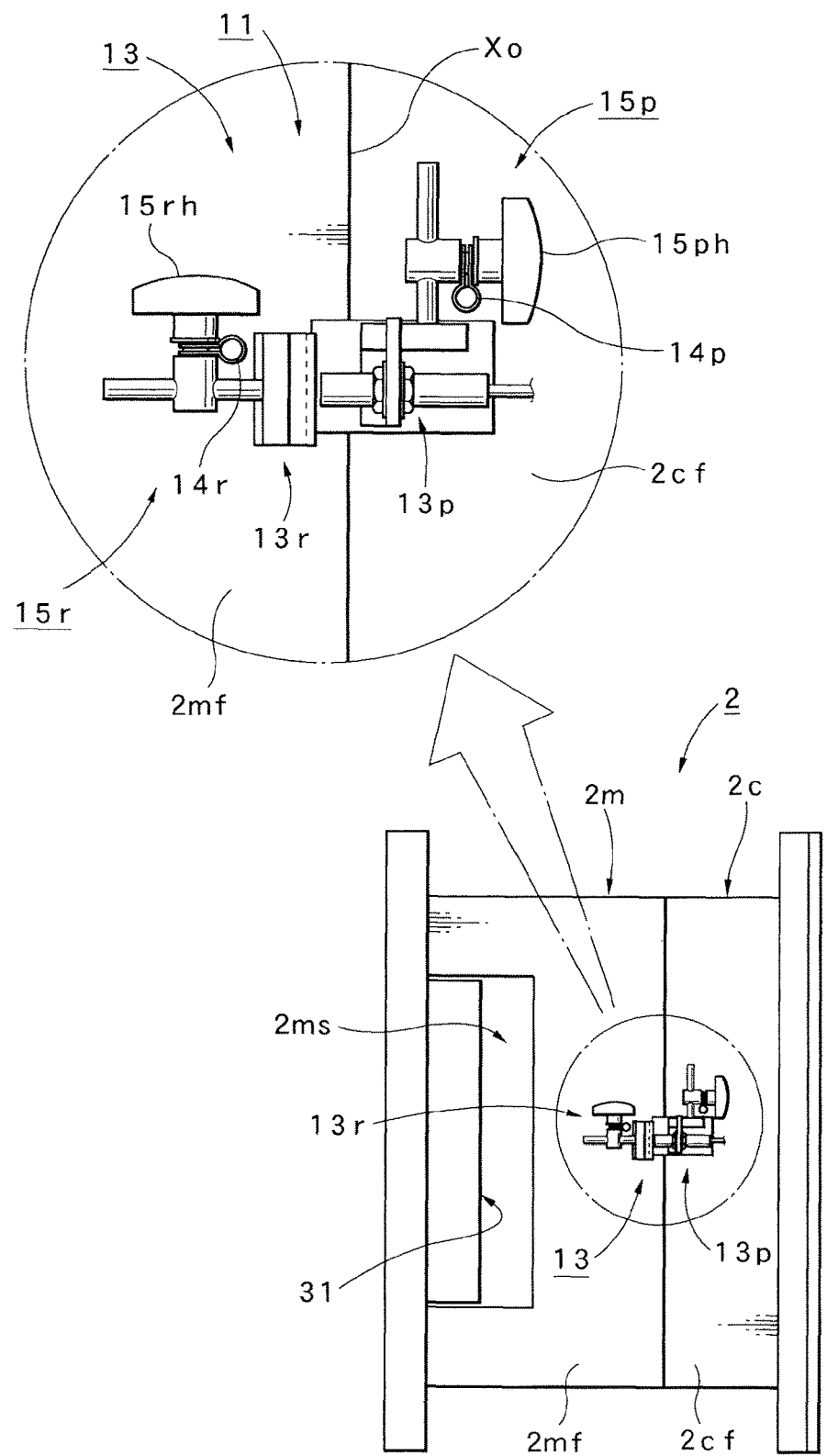
FIG. 4: A illustrates the configuration of a side face of the distance measurement sensor provided in the injection molding machine.

Thus, as shown in FIG. 3, the projection section 13p has, at the neighborhood of the outer edge portion Xo, a round bar-like support stay 14p provided in a protruding manner on the outer face 2cf of the fixed mold 2c. This support stay 14p is used to support the projection section 13p including the support mechanism 15p to thereby secure the distance Lx. Similarly, the projection section 13p also has, at the neighborhood of the outer edge portion Xo, a round bar-like support stay 14r provided in a protruding manner on the outer face 2mf of the movable mold 2m. This support stay 14r is used to support the reflecting section 13r including the support mechanism 15r to thereby secure the distance Lx.

The support mechanism 15p includes an adjustment handle 15ph. Loosening this adjustment handle 15ph can adjust the position of the projection section 13p on support stay 14p (vertical position), the horizontal position of the projection section 13p, and the angle of the projection section 13p (direction). Tightening the adjustment handle 15ph can fix the posture of the projection section 13p. Similarly, the support mechanism 15r includes an adjustment handle 15rh. Loosening this adjustment handle 15rh can adjust the position of the reflecting section 13r on the support stay 14r (vertical position), the horizontal position of the reflecting section 13r, and the angle of the reflecting section 13r (direction). Tightening the adjustment handle 15rh can fix the posture of the reflecting section 13r.

As described above, the projection section 13p and the reflecting section 13r provided in the distance measurement sensor 13 are provided at positions away from the outer faces 2mf and 2cf in the outer direction of the orthogonal direction by the fixed distance Lx or more. This configuration can detect the change angle Qm or the physical amount corresponding to this change angle Qm (the measurement distance Lc) in a mechanically-amplified manner, thus advantageously detecting even a minute angle change in a secure and accurate manner. The projection section 13p and the reflecting section 13*r* are respectively supported by the support stays 14*p* and 14*r* having a predetermined length provided on the outer faces 2*cf* and 2*mf* in a protruding manner. Thus, conditions for providing the projection section 13*p* and the reflecting section 13*r* at positions away from the outer faces 2*mf* and 2*cf* in the outer direction in the orthogonal direction by the fixed distance Lx or more can be easily realized by a relatively-simple structure. In addition, the projection section 13*p* and the reflecting section 13*r* respectively have the support mechanisms 15*p* and 15*r*. The support stays 14*p* and 14*r* support the support mechanisms 15*p* and 15*r*. The support mechanisms 15*p* and 15*r* can be used to adjust at least the distance Lx from the outer faces 2*cf* and 2*mf* to the projection section 13*p* and the reflecting section 13*r*. This configuration has an advantage that this configuration can optionally perform the sensitivity adjustment (position adjustment) of the distance measurement sensor 13 and can easily add other adjustment mechanisms such as angle adjustment mechanism to the projection section 13*p* and the reflecting section 13*r*.

The projection section 13*p* and the reflecting section 13*r* included in the distance measurement sensor 13 are provided so as to have the predetermined interval Lo during the mold clamping prior to the injection filling and to be able to detect at least the change distance Ln in the shortening direction (negative direction). This configuration can allow an interval of the inner portion Xi in parting plane direction at the parting gap C caused between the movable mold 2*m* and the fixed mold 2*c* to be larger than the interval of outer edge portion Xo and thus the change angle Qm is also changed. Thus, as shown in FIG. 10, the reflecting section 13*r* is mainly inclined and is closer to the projection section 13*p* side. This can consequently detect the deflection of the mold 2 (the movable mold 2*m*) due to the elastic deformation.

As described above, the projection section 13*p* and the reflecting section 13*r* included in the distance measurement sensor 13 are provided so as to have the predetermined interval Lo during the mold clamping prior to the injection filling and to be able to detect at least the change distance Ln in the shortening direction. This configuration can easily detect, by setting the detection result of the distance measurement sensor 13 at the predetermined interval Lo to 0 (zero reset position), the specific mold status Ac based on the change distance Ln in the shortening direction (negative direction). On the other hand, when the change distance Lm in the increasing direction (positive direction) is detected, it can be detected that the movable mold 2*m* is displaced in the open direction without having elastic deformation.

FIG. 5 to FIG. 8 show various embodiments of the parting opening amount Lm and the parting gap C. The parting gap C basically means a gap caused by the deflection of the mold 2 (the movable mold 2*m*) due to the elastic deformation. The parting opening amount Lm means a gap caused by the movable mold 2*m* displaced in the open direction without causing the mold 2 to have elastic deformation.

FIG. 5 illustrates a status in which the mold cavity is filled with the resin R and the resin R is fixated through cooling. This status is basically the same as the mold clamping status in which the resin R is not filled. Thus, the movable mold 2*m* is not displaced or deflected. In this status, the detection result of the distance measurement sensor 13 shows the distance Lo. This distance Lo is set to 0 position (zero reset position).

Figure 6:
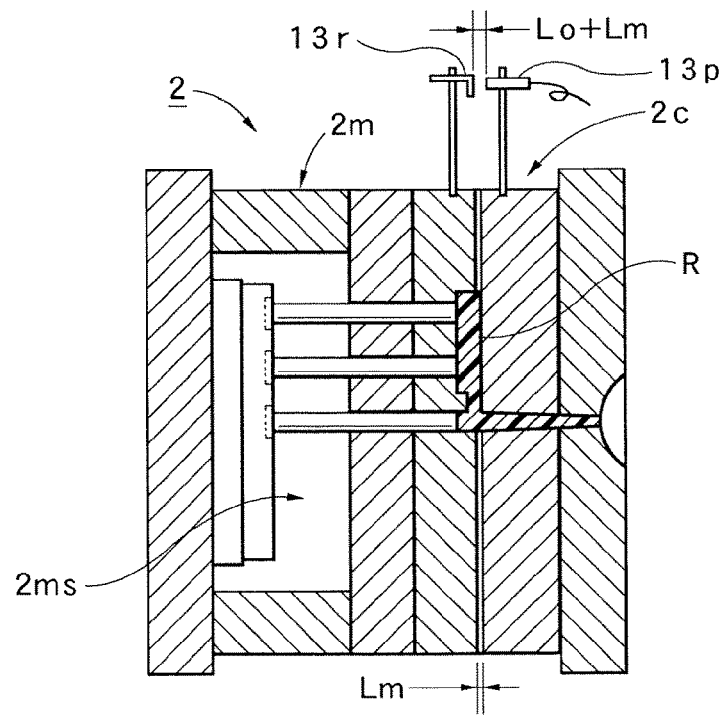
FIG. 6: A bottom cross-sectional view illustrating resin filled in the mold provided in the injection molding machine and the mold has no elastic deformation.

FIG. 6 illustrates a status in which, without causing the movable mold 2*m* to have deflection due to elastic deformation, the movable mold 2*m* is displaced in the open direction to cause a gap corresponding to the parting opening amount Lm. This is a case when the molding method disclosed in Patent Publication 1 is used. The detected distance is Lo(0)+Lm. The resin R has natural compression mainly provided by the action of the mechanism side in the mold clamping apparatus Mc. As described above, when the change of the measurement distance Lc in the increasing direction (positive direction) is detected, it can be detected that the movable mold 2*m* is displaced in the open direction without having elastic deformation.

Figure 7:
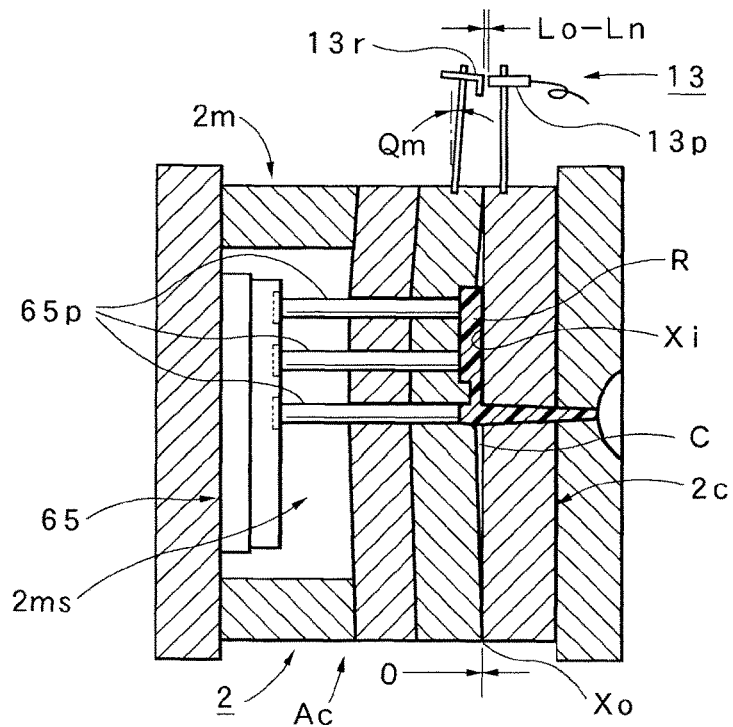
FIG. 7: A bottom cross-sectional view illustrating resin filled in the mold provided in the injection molding machine and the mold has elastic deformation.

On the other hand, FIG. 7 shows a case where the interval of the inner portion Xi of the parting gap C in the parting plane direction is larger than the interval of outer edge portion Xo and the change angle Qm is caused. In this case, the mold 2 (the movable mold 2*m*) has elastic deformation and is deflected. Thus, the reflecting section 13*r* is mainly inclined and is closer to the projection section 13*p* side. Therefore, by setting the detection result of the distance measurement sensor 13 at the interval Lo to 0 position, then the change distance Ln can be caused in the shortening direction (negative direction), thus easily detecting that the mold 2 is in the specific mold status Ac.

Figure 8:
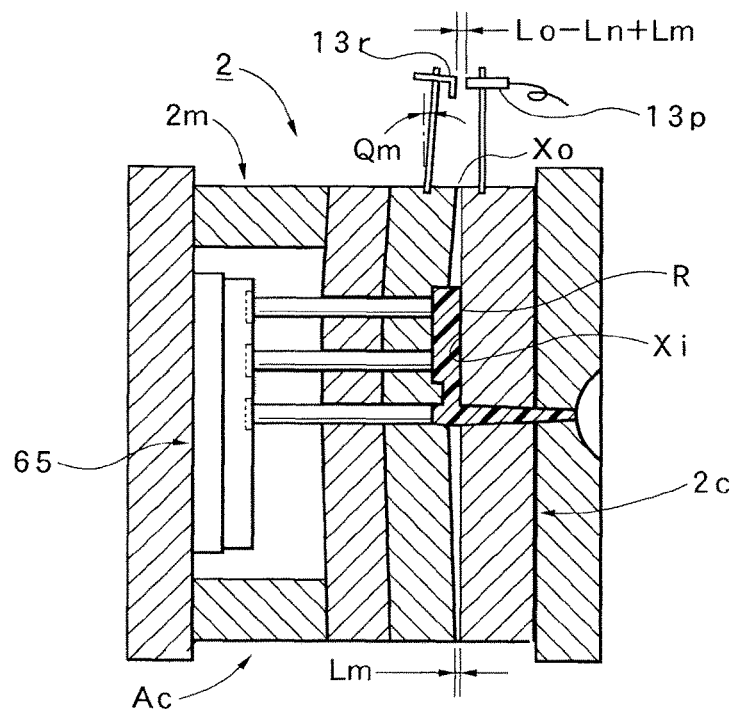
FIG. 8: A bottom cross-sectional view illustrating resin filled in the mold provided in the injection molding machine and the mold has elastic deformation and is opened.

FIG. 8 shows a case where the change distance Ln (the parting gap C) in the shortening direction and the parting opening amount Lm in the increasing direction are both generated and thus a compound distance Lo(0)−Ln+Lm is caused. Thus, the mold 2 shown in FIG. 7 and FIG. 8 is allowed to have the specific mold status Ac used when the molding operation is performed by the molding method according to this embodiment.

On the other hand, a hydraulic circuit 35 is configured so that the primary side of the valve circuit 37 has a pressure sensor 47 for detecting a hydraulic pressure and a temperature sensor 48 for detecting an oil temperature. The projection section 13*p*, the pressure sensor 47, and the temperature sensor 48 provided in distance measurement sensor 13 are connected to a sensor port in the molding machine controller 12.

The molding machine controller 12 has a display 61 attached to this molding machine controller 12. The molding machine controller 12 has a servo amplifier 64 as shown in FIG. 10. The output section of this servo amplifier 64 is connected to the servo motor 39. The servo amplifier 64 has an encoder pulse input section connected to a rotary encoder 40. As shown in FIG. 10, the molding machine controller 12 has a control signal output port connected to the valve circuit 37.

The molding machine controller 12 includes a controller body 63 and the servo amplifier 64. The controller body 63 has a computer function including a CPU and hardware such as an internal memory. Thus, the internal memory has a program area 63*p* for storing various programs including a control program (software) to execute various calculation processings and various control processings (sequence control) and also has a data area 63*m* that can store various pieces of data (database) for example. In particular, the program includes a control program (sequence control program) to perform the molding operation using the molding method according to this embodiment. Thus, during the next function, i.e., during the injection filling, the specific mold status Ac is caused in which the interval of the inner portion Xi in the parting plane direction of the parting gap C between the fixed mold 2*c* and the movable mold 2*m* is larger than the interval of the outer edge portion Xo and the interval of the outer edge portion Xo is equal to or smaller than the predetermined size Ls including 0. This also can perform the setting function Fs for setting the molding injection pressure Pi that is an injection pressure at which a non-defective product can be molded and the molding mold clamping force Pc that is a mold clamping force by which a non-defective product can be molded and the control function Fc for using, during the production, the molding mold clamping force Pc to clamp the mold 2 and for injecting and filling the resin R into the clamped mold 2 by the molding injection pressure Pi and for removing the molded piece G after the passage of the predetermined cooling time Tc.

On the other hand, the display 61 has a display body 61*d* and a touch panel 61*t* attached to this display body 61*d*. This display body 61*d* and the touch panel 61*t* are connected to the controller body 63 via a display interface 62. Thus, this touch panel 61*t* can be used to perform various setting operations and selection operations for example.

As described above, the control means 3 is configured to include the gap status detector 11 that detects the fixed mold 2*c* abutted to the outer edge portion Xo and the relative change angle Qm between the outer faces 2*cf* and 2*mf* in the movable mold 2*m* or a physical amount corresponding to this change angle Qm (the measurement distance Lc) and the molding machine controller 12 that performs a control to maintain the specific mold status Ac based on the change angle Qm obtained from the gap status detector 11 or the physical amount corresponding to this change angle Qm (the measurement distance Lc). This configuration can directly detect the shape change of the parting gap C between the fixed mold 2*c* and the movable mold 2*m*, i.e., the deflection of the mold 2 due to the elastic deformation in an easy and accurate manner.

Next, the following section will specifically describe the operation of the injection molding machine M including the molding method according to this embodiment with reference to FIG. 1 to FIG. 13.

Figure 2:
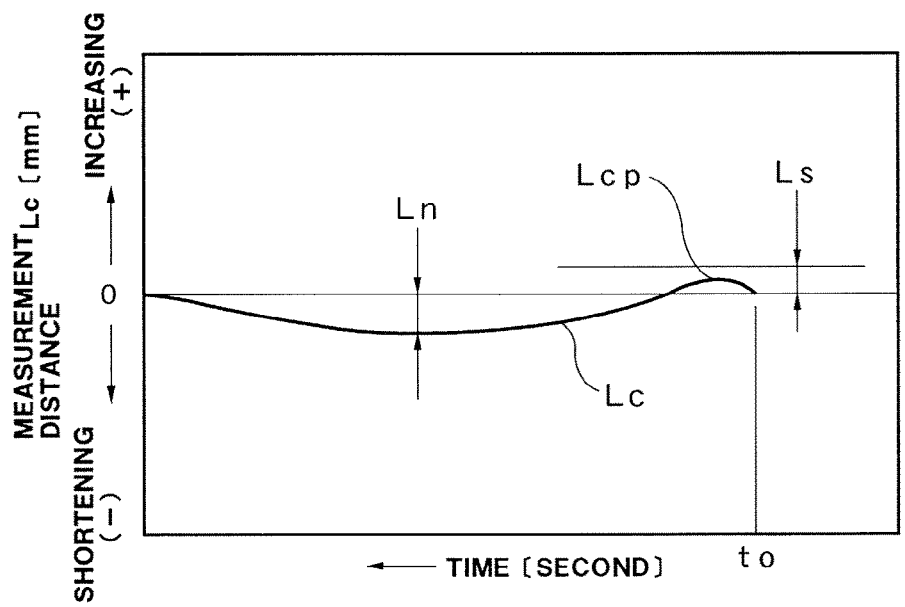
FIG. 2: A illustrates the principle of the molding method using the injection molding machine.

First, the following section will describe the outline of the molding method according to the invention with reference to FIG. 2. First, a test molding is performed to calculate the molding mold clamping force Pc and the molding injection pressure Pi used for the production that are set as molding conditions. The molding mold clamping force Pc and the molding injection pressure Pi are calculated under the following two conditions: the specific mold status Ac is caused in which the parting gap C is caused during the injection filling between the fixed mold 2*c* and the movable mold 2*m* and the interval of the inner portion Xi in the parting plane direction of the parting gap C is larger than the interval of the outer edge portion Xo and the interval of the outer edge portion Xo is equal to or lower than the predetermined size Ls including 0; and the molded piece G is prevented from having a molding defect such as burr, sink mark, and warpage. The production is carried out under the following two conditions: the set molding mold clamping force Pc is used to perform the mold clamping; and the molding injection pressure Pi is set to the limit pressure Ps. The resin R is provided by a simple injection filling.

In this case, the status of the parting gap C is acquired based on the detection result of the measurement distance Lc obtained from the distance measurement sensor 13. Specifically, the status in which the interval of the inner portion Xi of the parting gap C in the parting plane direction is larger than the interval of the outer edge portion Xo is a status in which the mold 2 (the movable mold 2*m* in particular) has deflection due to elastic deformation. Thus, as shown in FIG. 7 and FIG. 10, the change angle Qm is caused between the outer face 2*mf* of the movable mold 2*m* and the outer face 2*cf* of the fixed mold 2*c*, thus causing the support stay 14*p* to incline by the change angle Qm. This causes the reflecting section 13*r* to be closer to the projection section 13*p* side.

Thus, the measurement distance Lc showing the detection result obtained from the distance measurement sensor 13 changes from 0 by an amount of Ln in the shortening direction (negative direction).

FIG. 2 shows the typical change characteristic of the measurement distance Lc causing the specific mold status Ac. In the case of FIG. 2, the time point "to" shows the start of the injection filling. At the time point "to", the measurement distance Lc is set to 0. When the mold 2 is filled with the resin R, the resin pressure in the mold 2 causes the movable mold 2*m* to be slightly displaced in the open direction (i.e., the increasing direction). FIG. 2 shows this change distance by the reference numeral Lcp. This change distance Lcp is the parting opening amount Lm shown in FIG. 6. Thus, this parting opening amount Lm is selected as the molding mold clamping force Pc and the molding injection pressure Pi so as to be equal to or smaller than the predetermined size Ls including 0. The "Ls" as an interval of this outer edge portion Xo is desirably set to 0.3 [mm] or less. By the setting as described above, the shape of the parting gap C can additionally have the interval-like factor of the parting gap C in the conventional case, thus diversifying the parting gap C to thereby increase the setting freedom for optimization.

When the mold 2 is filled with the resin R, the pressure in the mold 2 increases to cause a phenomenon in which the inner portion of the movable mold 2*m* is swelled, i.e., the deflection due to the elastic deformation is caused, thereby causing the specific mold status Ac. The deflection of the movable mold 2*m* causes the measurement distance Lc acquired from the distance measurement sensor 13 to be displaced in the shortening direction. Thus, the measurement distance Lc changes from 0 to Ln as shown in FIG. 2 in the shortening direction (negative direction). Then, when the filling operation is completed, a cooling operation is performed. Then, the mold 2 (the movable mold 2*m*) elastically recovers. This elastic recovery action provides the natural compression to the resin R. As a result, the magnitude of the measurement distance Lc obtained from the distance measurement sensor 13 also gradually changes to the 0 side.

As described above, during the injection filling, the mold 2 has deflection due to the elastic deformation to thereby cause the parting gap C. This parting gap C has the specific mold status Ac in which the interval of the inner portion Xi in the parting plane direction of the parting gap C is larger than the interval of the outer edge portion Xo and the interval of the outer edge portion Xo is equal to or smaller than the predetermined size Ls including 0. As a result, during the cooling, the elastic recovery of the mold 2 provides natural compression. Thus, even when the behavior of the mold 2 injected and filled by the injection apparatus Mi is unstable, the mold clamping apparatus Mc adopts to the unstable behavior of the resin R, thus providing a molded piece having the highest quality and homogeneity.

Figure 11:
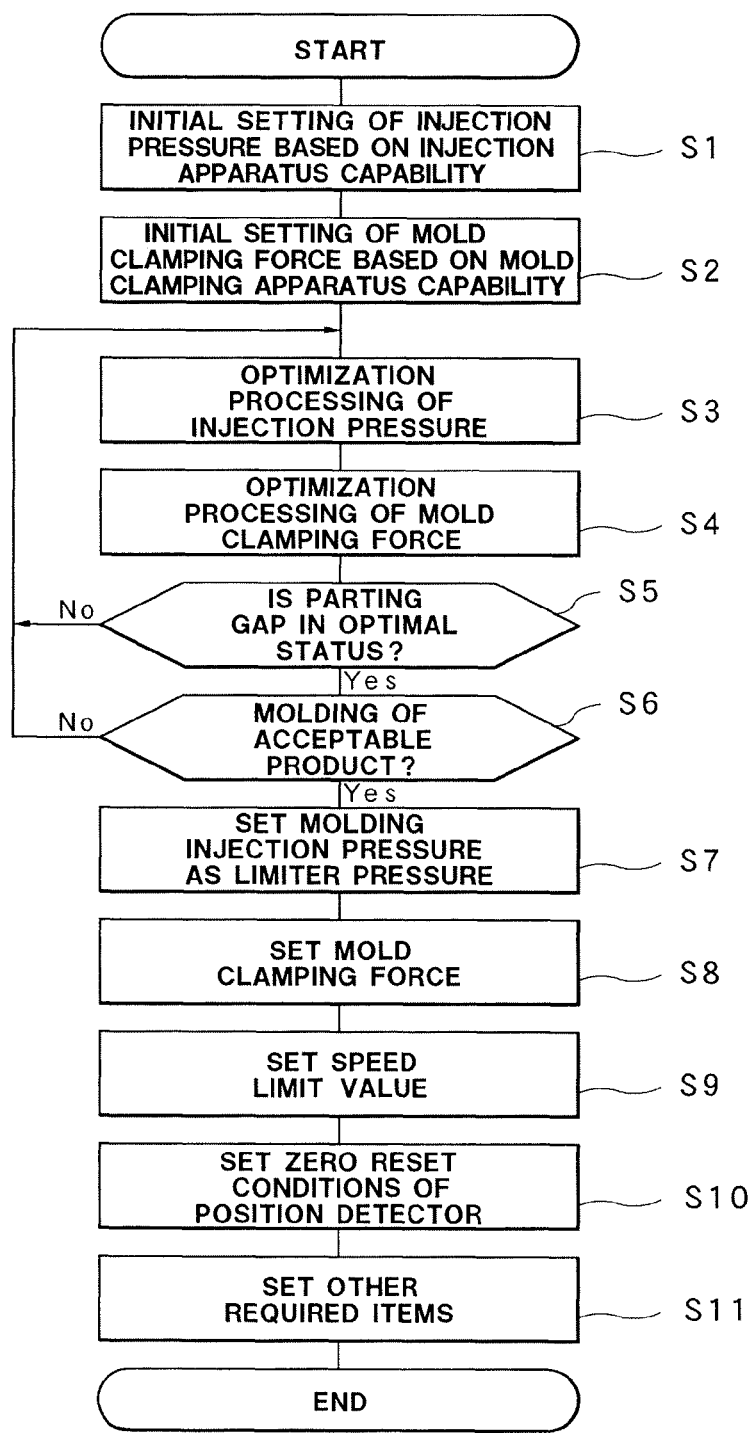
FIG. 11: A flowchart for explaining a processing procedure for setting the molding conditions in the injection molding machine.

Next, the following section will describe a specific processing procedure. First, the setting function Fs in the control means 3 is used to calculate the molding injection pressure Pi and the molding mold clamping force Pc as molding conditions. The calculated molding injection pressure Pi and molding mold clamping force Pc are set as molding conditions. FIG. 11 is a flowchart illustrating a processing procedure to calculate and set the molding injection pressure Pi and the molding mold clamping force Pc.

By the way, in order to cause the specific mold status Ac during the injection filling in which the interval of the inner portion Xi in the parting plane direction of the parting gap C caused between the fixed mold 2*c* and the movable mold 2m is larger than the interval of the outer edge portion Xo and the interval of the outer edge portion Xo is equal to or smaller than the predetermined size Ls including 0, then the mold clamping apparatus Mc must be selected that provides, in accordance with the solidification of the resin R in the mold 2, at least the natural compression of resin R due to the elastic recovery of the mold 2.

The provision of the specific mold status Ac as described above is closely related to the magnitude of the mold clamping force and the selection of the magnitude of the injection pressure and the material and structure of the mold 2. Thus, the provision of the specific mold status Ac may be achieved by selecting, in advance, the material and structure of the mold 2 or by combining the material and structure of the mold 2 with the magnitude of the mold clamping force and the magnitude of the injection pressure. The structure of the mold 2 itself may be, for example, the one as shown in FIG. 5 in which the movable mold 2m includes therein an arrangement space 2ms to store an ejector mechanism 65 so that the inner portion of the movable mold 2m can be easily deflected to the outer edge portion. The reference numeral 65p . . . denotes an ejector pin provided in the ejector mechanism 65 that is displaced in the forward or rear direction.

The following section will describe specific processings in a sequential manner. First, the injection pressure as injection conditions at the injection apparatus Mi side is initially set by an injection pressure setting section (not shown) in the molding machine controller 12. The injection pressure at this time can be set as an injection pressure based on the capability (driving force) of the injection apparatus Mi (Step S1). In this case, the injection pressure can be calculated based on the magnitude of the hydraulic pressure detected by the pressure sensor 47 in the hydraulic circuit 35 connected to the injection cylinder 24. The injection pressure is a value that is not required to be accurately calculated as an absolute value. Thus, the magnitude of the detected hydraulic pressure may be used or the pressure may be converted to an injection pressure by calculation.

Next, the mold clamping force functioning as mold clamping conditions at the mold clamping apparatus Mc side is initially set by the mold clamping force setting section (not shown) in the molding machine controller 12. The mold clamping force at this time can be set as a mold clamping force based on the capability (driving force) of the mold clamping apparatus Mc (Step S2). In this case, the mold clamping force can be calculated based on the hydraulic pressure detected by the pressure sensor (hydraulic sensor) 47 in the hydraulic circuit 35 connected to the mold clamping cylinder 27. The mold clamping force has a value that is not required to be accurately calculated as an absolute value. Thus, the magnitude of the detected hydraulic pressure may be used or the pressure may be converted to the mold clamping force by calculation.

The hydraulic circuit 35 is switched by the valve circuit 37 and functions as a hydraulic circuit of the mold clamping apparatus Mc side during the mold clamping and functions as a hydraulic circuit of the injection apparatus Mi side during the injection. By detecting the injection pressure and the mold clamping force by the pressure sensor 47 as described above, the setting related to the molding mold clamping force Pc and the molding injection pressure Pi can be performed easily. Furthermore, it is not required to accurately set the molding mold clamping force Pc and the molding injection pressure Pi as an absolute value, thus providing an accurate operation control having less error factors.

Next, the initially-set injection pressure is subjected to an optimization processing to thereby calculate the molding injection pressure Pi used for the production and the initially-set mold clamping force is subjected to an optimization processing to thereby calculate the molding mold clamping force Pc used for the production (Steps S3 and S4). The following section will describe an example of the method of optimizing the mold clamping force and the injection pressure.

First, the initially-set mold clamping force and the injection pressure are used to perform a test molding. By depressing a not-shown molding start button, the mold clamping operation is performed and the initially-set conditions are used to perform the test molding using the mold 2. When the mold clamping force is set to have a high value, no burr is caused and sink mark, warpage, or a degassing status tend to have a defect or a slight defect. By changing the magnitude of the mold clamping force and the magnitude of the injection pressure in a staged manner and by performing the test molding at the respective stages, the status of the parting gap C between the fixed mold 2c and the movable mold 2m is acquired from the distance measurement sensor 13 and is displayed by the waveform display section 61v in the screen of the display 61 to observe whether the molded piece G is acceptable or not (Steps S5 and S6).

Figure 1:
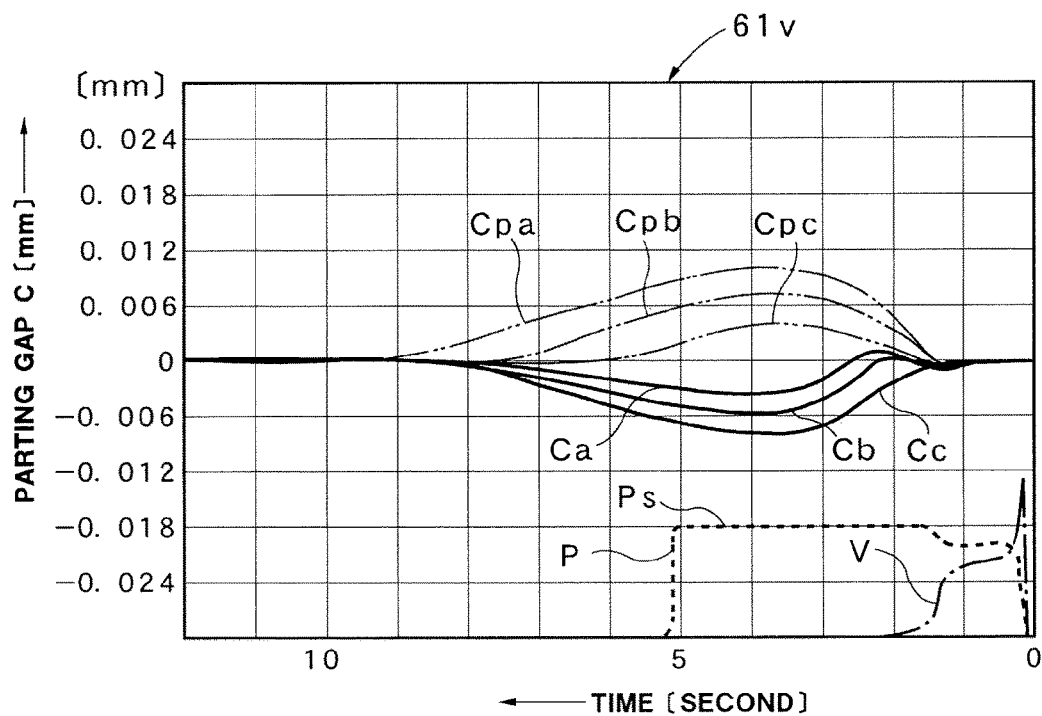
FIG. 1: An extraction diagram illustrating a waveform display section displayed on a display screen of a molding machine controller in an injection molding machine according to a preferred embodiment of this invention.

FIG. 1 illustrates a display example of the waveform display section 61v. Change waveforms of Ca, Cb, and Cc shown by the solid lines in FIG. 1 are a waveform similar to the change waveforms shown in FIG. 2. Any of the change waveforms Ca, Cb, and Cc shows the specific mold status Ac. Change waveforms Cpa, Cpb, and Cpc shown by the virtual line in FIG. 1 show a status in which the displacement in the open direction is caused without causing the deflection of the movable mold 2m. Specifically, the status shown in FIG. 6 is caused. In this case, a gap is caused by the parting opening amount Lm. Specifically, the specific mold status Ac is not obtained. So, the specific mold status Ac can be caused by increasing the mold clamping force and the injection pressure for example. In FIG. 1, the reference numeral V and P represent the typical change waveforms of the injection speed and the injection pressure, respectively.

The injection pressure is optimized by providing the molding injection pressure Pi under conditions in which the movable mold 2m and the fixed mold 2c have therebetween the above-described predetermined parting gap C during the injection filling and a non-defective product can be molded. Specifically, the injection pressure is appropriately changed so as to always prevent the mold 2 from being abnormally filled with the resin R. By selecting the molding injection pressure Pi having such a minimum value or a value close to the minimum value, the molding mold clamping force Pc also can be set to the minimum value or a value close to the minimum value. This can consequently provide the optimal performance from the viewpoint of energy saving and can provide the protection and a longer service life to a mechanism component for example. The calculated molding injection pressure Pi is set as a limiter pressure Ps to the injection pressure during the production (Step S7). As described above, by setting the molding injection pressure Pi as the limit pressure Ps for the production, then an advantage is obtained in which the molding injection pressure Pi can be always maintained without controlling the pressure. By repeating these test moldings with different conditions, the mold clamping force satisfying the above-described conditions can be selected. The selected mold clamping force is set as the molding mold clamping force Pc used to perform the mold clamping operation by the mold 2 during the production (Step S8).

In this case, the magnitudes of the mold clamping force and the injection pressure may be arbitrarily set by an operator or may be automatically or semi-automatically calculated by additionally using an auto-tuning function provided in the injection molding machine M for example. When the auto tuning function is used, the mold clamping force immediately before the occurrence of burr can be calculated easily.

A speed limit value may be set with regard to the injection speed of the injection apparatus Mi (Step S9). This speed limit value is not always required to be set. However, by setting the speed limit value, the mold 2 or an injection screw for example can be mechanically protected if by any chance the injection speed V is excessively high. Thus, the speed limit value is set to such a value that can provide the mechanical protection to the mold 2 and the injection screw for example.

Then, the processing is to set zero reset conditions regarding the distance measurement sensor 13 for setting the parting gap C (Step S10). In the injection molding machine M according to this embodiment, during the production described later, when a predetermined injection preparation after at least the mold clamping by the mold clamping apparatus Mc is completed and a predetermined timing is reached, the timing at which this reset control is performed is set as a reset timing as zero reset conditions in order to perform a reset control for resetting the distance measurement sensor 13 to zero. Other required settings are also performed (Step S11).

Figure 12:
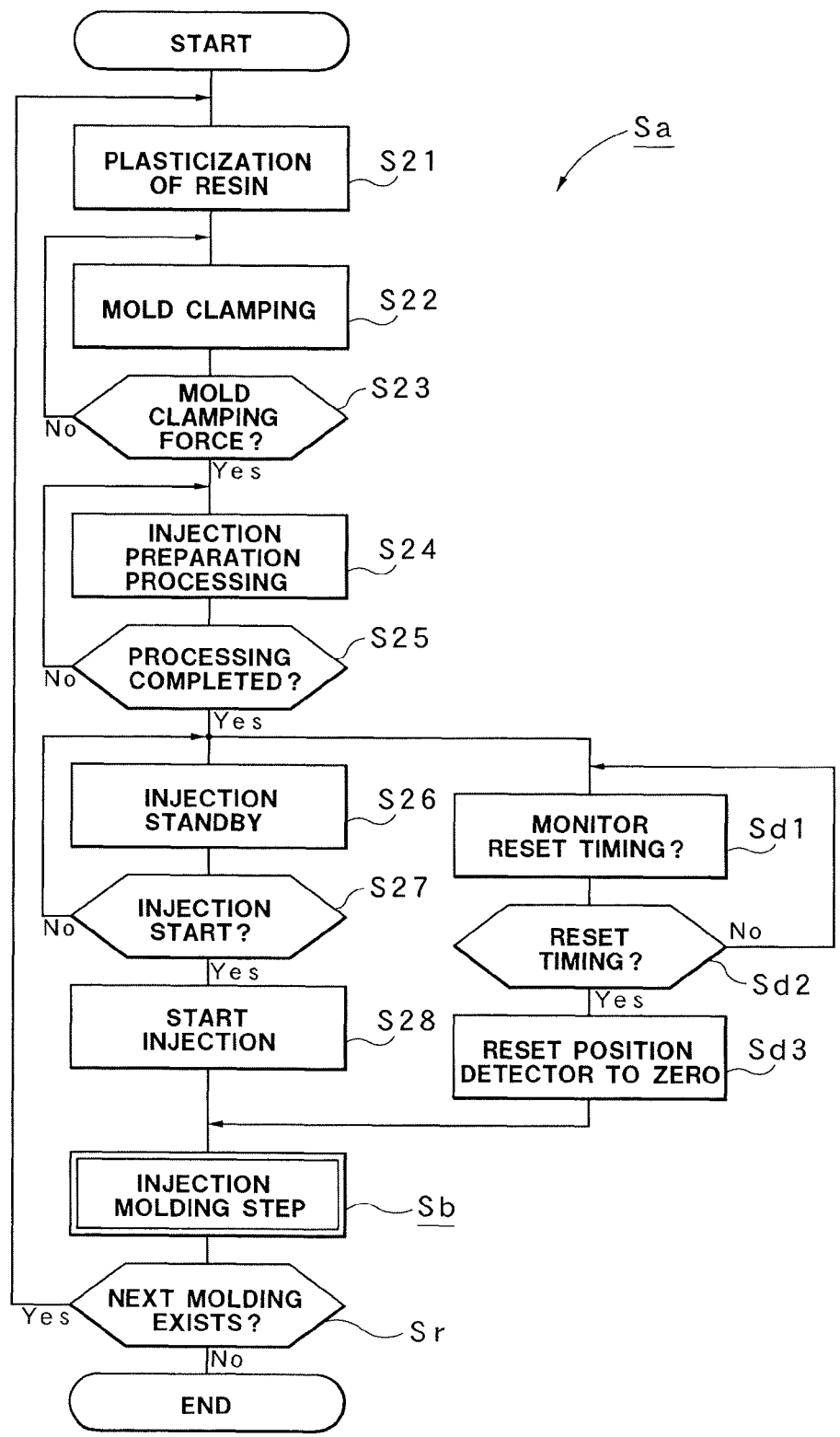
FIG. 12: A flowchart for explaining a pre-filling step in the production using the molding method.
Figure 13:
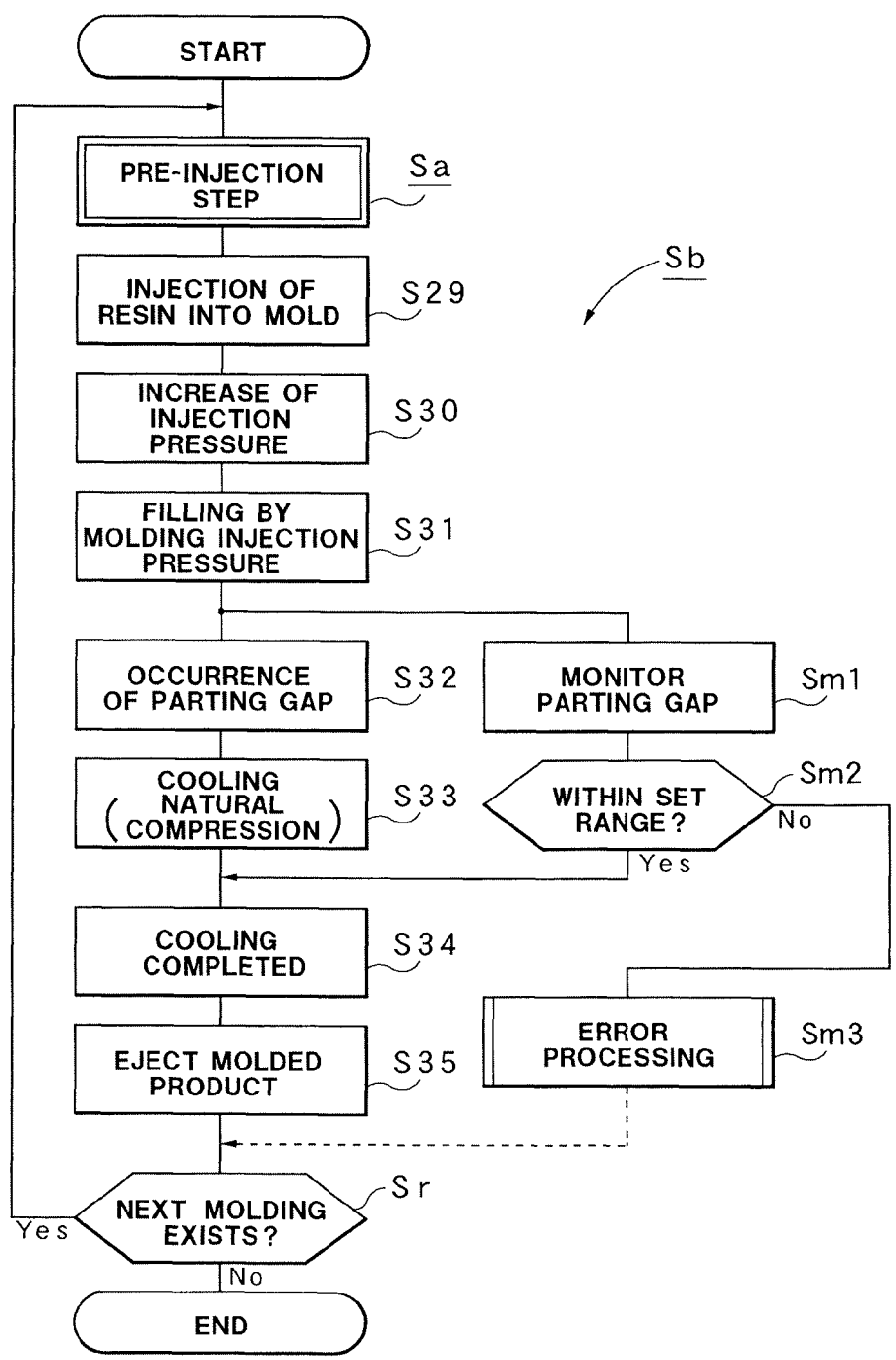
FIG. 13: A flowchart for explaining the processing procedure of a filling molding step in the production using the molding method.

Next, the following section will describe the specific processing procedure using the molding method according to this embodiment with reference to the respective drawings and based on the flowcharts shown in FIG. 12 and FIG. 13.

FIG. 12 and FIG. 13 illustrate the processing procedure during the production using the molding injection pressure Pi and molding mold clamping force Pc. FIG. 12 shows the pre-filling step Sa from the injection preparation to the injection start. FIG. 13 shows the filling molding step Sb from the filling start to the molded piece ejection.

First, the switching of the valve circuit 37 and the control of the servo motor 39 are used to drive the measurement motor 25 of the injection apparatus Mi to subject the resin R to a plasticization processing (Step S21). This molding method does not require a measurement step as in general molding methods to accurately measure the resin R. Specifically, in the case of the molding method in this embodiment, the injection step only requires the injection operation to be carried out until the cavity is filled with the resin R. Thus, the resin R measured to have a slightly-excessive level may be sufficient in the measurement step. Thus, although the measurement operation is performed in the general measurement step, a measurement control for obtaining an accurate measurement value is not required.

The switching of the valve circuit 37 and the control of the servo motor 39 are used to drive the mold clamping cylinder 27 of the mold clamping apparatus Mc and the mold 2 is clamped so that the molding mold clamping force Pc set by the mold clamping force is reached (Steps S22 and S23). The status of the clamped mold 2 is the same as the status shown in FIG. 5 except for that the resin R is not filled.

When the mold clamping is completed, then the processing related to the injection preparation is performed (Steps S24 and S25). This processing includes a nozzle touch by a nozzle touch operation and the control of the mold temperature. In the nozzle touch operation, such a control is performed that the injection apparatus moving cylinder 26 is drive-controlled to forwardly move the injection apparatus Mi and the nozzle touches the mold 2. The mold temperature is subjected to a control processing in which the mold temperature fluctuated due to the mold opening reaches a formal set temperature. When these processings related to the injection preparation are completed, the injection apparatus Mi is put in an injection standby status (Step S26).

At the time point "to" for the injection start, then the switching of the valve circuit 37 and the control of the servo motor 39 are used to drive the injection cylinder 24 of the injection apparatus Mi to subject the mold 2 to the injection processing of the resin (Steps S27 and S28). In this case, the screw 21 may be moved forward by a rated operation, thus eliminating the need of subjecting the screw 21 to a speed control and a pressure control. The molding machine controller 12 on the other hand monitors whether or not the set reset timing is reached (Step Sd1). Specifically, when such a setting is performed to set the reset timing to the time point "to" to start the injection (FIG. 2), then the injection is started when the time point "to" is reached and a reset control is performed to reset the distance measurement sensor 13 to zero (Steps Sd2 and Sd3).

In the manner as described above, the pre-filling step Sa is completed. Next, the processing proceeds to the filling molding step Sb. When the injection is started at the time point "to", then the cavity of the mold 2 is filled with the plasticized and molten resin R in the heating tube 22 (Step S29). With the filled resin R, the injection pressure P increases as shown in FIG. 1 and then approaches the limit pressure Ps and reaches the limit pressure Ps at which a control for maintaining the limit pressure Ps, i.e., a control for preventing the overshoot, is performed to maintain the injection pressure P at the limit pressure Ps (the molding injection pressure Pi) (Steps S30 and S31). Thus, the injection operation substantially provides a first class pressure control. In FIG. 1, the reference numeral V denotes the injection speed during this.

The cavity of the mold 2 filled with the resin R allows the mold 2 to be pressurized by the resin R, causing the parting gap C between the fixed mold 2c and the movable mold 2m (Step S32). This parting gap C is generated based on the molding mold clamping force Pc and the molding injection pressure Pi set in advance. Thus, the parting gap C has the interval of the inner portion Xi larger than the interval of outer edge portion Xo and the interval of the outer edge portion Xo is equal to or smaller than the predetermined size Ls including 0. Specifically, the above-described specific mold status Ac is caused. This can consequently provide a favorable degassing and a non-defective product molding excluding defects. During this, the mold 2 is put in the status shown in FIG. 7 or FIG. 8.

When the injection filling of the resin R to the mold 2 is completed, then the resin R is fixated with time passage and this solidification causes the natural compression of the resin R (Step S33). Specifically, since the solidification of the resin R causes the reduction of the volume, the natural compression is performed by the pressurization action by the elastic recovery of the mold 2 (the movable mold 2m in particular) so as to follow the reduction of the volume. Then, when the set cooling time Tc has passed, the switching of the valve circuit 37 and the control of the servo motor 39 are used to drive the mold clamping cylinder 27 to rearwardly move the movable mold 2m to thereby perform the mold opening. The switching of the valve circuit 37 and the control of the servo motor 39 are used to drive the ejector cylinder 31 to protrude the molded piece G attached to the movable mold 2m (Steps S34 and S35). Then, the molded piece G is removed and one molding cycle is completed.

Thereafter, when the next molding is performed, then the resin R is similarly plasticized to perform the injection preparation and then processings such as a mold clamping, injection, or cooling may be similarly performed (Steps Sr, S21, and S22 . . . ).

On the other hand, at least in a period from the time point "to" of the injection start to the completion of the cooling of the mold 2, the change data of the parting gap C is detected. Specifically, the distance measurement sensor 13 is used to detect the magnitude of the parting gap C to time (change data) with a fixed sampling time interval. As a result, the detected change data of the parting gap C is given to the controller body 63. The waveform is displayed as needed on the waveform display section 61v shown in FIG. 1 in the display 61 in accordance with the progress of the molding step. In this case, the time along the time axis of the horizontal axis is secured at least from the time point "to" at the injection start to the completion of the cooling of the mold 2. As a result, the operator can use the waveform display section 61v to monitor the waveform change of the parting gap C of the mold 2 showing the operation waveform at the mold clamping apparatus Mc side.

As described above, the molding machine controller 12 is configured so that the change data corresponding to a period from the injection start detected by the distance measurement sensor 3 to the completion of the cooling of the mold 2 is displayed by the waveform display section 61v of the display 61 attached to the molding machine controller 12. This configuration can provide the visual monitoring of the change of the parting gap C of the mold 2 showing the operation waveform at the mold clamping apparatus Mc side in an easy and effective manner. In addition, by the above-described zero reset effect, accurate waveforms for which the respective parting gaps C . . . have the same zero point can be displayed (and displayed in a superposed manner).

As a result, during an injection standby operation from the mold clamping operation to the injection start operation, the set molding mold clamping force Pc is maintained. Even when disturbance factors are caused by the fluctuation of the mold temperatures at the respective shoots and the operations in other parallelly performed steps, an unnecessary influence on the status of the parting gap C can be excluded, thus stably collecting accurate data related to the parting gap C. As a result, the respective parting gaps C . . . having the same zero point can be appropriately monitored and molded pieces G can be subjected to a processing to determine whether or not the molded pieces G are acceptable, thus also contributing to the improvement of the yield rate.

As shown in FIG. 13, the change data of the parting gap C may be monitored by setting a monitoring width as a set range to determine whether or not the change data is acceptable Steps Sm1 and Sm2). This consequently always provides an appropriate determination for the acceptability. When the data deviates from the set range (monitoring width) in the processing for the determination for the acceptability, a required error processing can be performed (Step Sm3).

Thus, the molding method (the injection molding machine M) according to this embodiment includes, in a basic configuration function, the mold clamping apparatus Mc that provides, by the solidification of the resin R in the mold 2, at least the natural compression of the resin R due to the elastic recovery of the mold 2. The specific mold status Ac is caused in which, during the injection filling, the interval of the inner portion Xi in the parting plane direction of the parting gap C between the fixed mold 2c and the movable mold 2m is larger than the interval of the outer edge portion Xo and the interval of the outer edge portion Xo is equal to or lower than the predetermined size Ls including 0. The method includes the control means 3 having the setting function Fs for setting the molding injection pressure Pi that is an injection pressure at which a non-defective product can be molded and the molding mold clamping force Pc that is a mold clamping force by which a non-defective product can be molded, and the control function Fc for using, during the production, the molding mold clamping force Pc to clamp the mold 2 and for injecting and filling the resin R into the clamped mold 2 by the molding injection pressure Pi and for performing a control removing the molded piece G after the passage of the predetermined cooling time Tc. Thus, the parting gap C can have the outer edge portion Xo side and the inner portion Xi side having different intervals (magnitudes). Specifically, the inner portion Xi side can have the parting gap C having an interval providing the optimal natural compression to the resin R. The outer edge portion Xo side can have the parting gap C having an optimal interval from the viewpoints of the degassing from the mold cavity and burr prevention for example, thus optimizing the interval and shape of the parting gap C for example. This can consequently secure the effect of the conventional molding method for setting the interval of the parting gap C only, i.e., molded pieces G having the highest quality and homogeneity and also can further improve the effects including the ones to achieve simpler molding conditions and easier setting, easier quality control, and a shorter molding cycle time for example.

Preferred embodiments have been described in detail in the above section. However, the invention is not limited to the above embodiment. The detailed configuration, shape, number, or method for example can be arbitrarily changed, added, or omitted within a range not deviating from the summary of this invention.

For example, the non-contact distance measurement sensor 13 was illustrated as the gap status detector 11 for detecting the status of the parting gap C. However, various sensors that can accurately detect the parting gap C can be used including various non-contact distance measurement sensors such as a proximity sensor or an angle sensor for directly detecting the change angle Qm. The interval of the outer edge portion Xo in the parting gap C is desirably set to 0.3 [mm] or less but also may be set to a value exceeding 0.3 [mm] depending on the type of molding material to be used or molding conditions for example. A case has been illustrated in which a direct pressure-type hydraulic mold clamping apparatus was used as the injection molding machine M. However, a toggle-type electric mold clamping apparatus also may be used. In this case, it is more desirable that a toggle link mechanism can be put in a non-lockup status.

INDUSTRIAL APPLICABILITY

The molding method according to this invention can be used for various injection molding machines in which a mold clamped by a predetermined mold clamping force is filled with injected resin by a predetermined injection pressure to perform a molding operation.

REFERENCE SIGNS LIST

2: Mold, 2c: Fixed mold, 2m: Movable mold, 3: Control means, M: Injection molding machine, Mi: Injection apparatus, Mc: Mold clamping apparatus, R: Resin, C: Parting gap, Xi: Inner portion of parting gap (parting plane direction), Xo: Outer edge portion of parting gap (parting plane direction), Ac: Specific mold status, (Pi): Molding injection pressure, (Pc): Molding mold clamping force, Fs: Setting function, Fc: Control function, G: Molded piece

CITATION LIST

Patent Literature 1

International Publication WO2011/161899

The invention claimed is:

1. A molding method of an injection molding machine, comprising the following steps:
    providing a mold consisting of a fixed mold and a movable mold clamped by a mold clamping apparatus with a predetermined mold clamping force,
    filling the mold with injected resin by an injection apparatus with a predetermined injection pressure to perform a molding operation,
    clamping the mold to provide at least a natural compression of the resin due to an elastic recovery of the mold in accordance with a solidification of the resin in the mold,
    providing a non-contact-type distance measurement sensor between an outer face of the fixed mold and an outer face of the movable mold, said non-contact-type distance measurement sensor includes a projection section provided at one of the fixed mold and the movable mold and a reflecting section provided at the other, said non-contact-type distance measurement sensor detects a measurement distance showing a physical amount corresponding to a change angle wherein the measurement distance obtained from the non-contact-type distance measurement sensor is used to detect the change angle between the outer face of the fixed mold and the outer face of the movable mold,
    utilizing the non-contact-type distance measurement sensor to achieve a specific mold status in advance during the injection filling in which an interval of an inner portion in a parting plane direction of a parting gap between the fixed mold and the movable mold is larger than an interval of an outer edge portion and the interval of the outer edge portion is equal to or smaller than a predetermined size including zero,
    setting a molding injection pressure by which a non-defective product can be molded,
    setting a molding mold clamping force by which a non-defective product can be molded,
    during a production, applying the molding mold clamping force to clamp the mold wherein resin is injected and filled into the clamped mold by the molding injection pressure, and
    removing a molded piece after a passage of a predetermined cooling time.

2. The molding method of the injection molding machine according to claim 1, wherein:
    the interval of the outer edge portion in the parting gap is set to 0.3 mm or less.

3. The molding method of the injection molding machine according to claim 1, wherein:
    during the injection filling, the change angle between the respective outer faces of the fixed mold and the movable mold abutted to the outer edge portion is detected and, based on this change angle, a control is performed to maintain the specific mold status.

4. The molding method of the injection molding machine according to claim 3, wherein:
    during the injection filling, a physical amount corresponding to the relative change angle between the respective outer faces of the fixed mold and the movable mold abutted to the outer edge portion is detected and, based on the physical amount corresponding to the change angle, a control is performed to maintain the specific mold status.

5. The molding method of the injection molding machine according to claim 4, wherein:
    a physical amount corresponding to the change angle is detected in a mechanically-amplified manner.

6. The molding method of the injection molding machine according to claim 1, wherein:
    the molding injection pressure is set as a limit pressure during the production.

* * * * *